United States Patent
Ramachandran et al.

(10) Patent No.: US 10,002,173 B1
(45) Date of Patent: Jun. 19, 2018

(54) SYSTEM AND METHODS FOR DYNAMICALLY ADJUSTING BETWEEN ASYNCHRONOUS AND SYNCHRONOUS DATA REPLICATION POLICIES IN A NETWORKED VIRTUALIZATION ENVIRONMENT

(71) Applicant: Nutanix, Inc., San Jose, CA (US)

(72) Inventors: Parthasarathy Ramachandran, Palo Alto, CA (US); Binny Sher Gill, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 33 days.

(21) Appl. No.: 14/027,576

(22) Filed: Sep. 16, 2013

(51) Int. Cl.
G06F 17/30 (2006.01)

(52) U.S. Cl.
CPC .............. G06F 17/30578 (2013.01)

(58) Field of Classification Search
None
See application file for complete search history.

(56) References Cited

U.S. PATENT DOCUMENTS

| | | | |
|---|---|---|---|
| 7,606,868 B1 | 10/2009 | Le | |
| 7,720,815 B1 | 5/2010 | Jagannathan | |
| 7,987,152 B1 | 7/2011 | Gadir | |
| 8,301,593 B2 * | 10/2012 | Hoffmann et al. | 707/615 |
| 8,341,115 B1 * | 12/2012 | Natanzon et al. | 707/613 |
| 8,473,557 B2 | 6/2013 | Ramakrishnan et al. | |
| 8,601,473 B1 | 12/2013 | Aron et al. | |
| 2003/0041074 A1 * | 2/2003 | Vasudevan et al. | 707/204 |
| 2005/0078854 A1 | 4/2005 | Shikano et al. | |
| 2006/0195666 A1 * | 8/2006 | Maruyama et al. | 711/162 |
| 2008/0059555 A1 | 3/2008 | Archer | |
| 2010/0250718 A1 * | 9/2010 | Igarashi | H04L 45/00 709/221 |
| 2010/0281166 A1 | 11/2010 | Buyya | |
| 2012/0246642 A1 | 9/2012 | Pafumi et al. | |
| 2013/0007741 A1 | 1/2013 | Britsch | |
| 2013/0047161 A1 | 2/2013 | Simitsis et al. | |
| 2014/0095817 A1 | 4/2014 | Hsu | |
| 2014/0317265 A1 * | 10/2014 | James | H04L 67/1004 709/224 |
| 2015/0066846 A1 | 3/2015 | Beard | |
| 2015/0134606 A1 | 5/2015 | Magdon-Ismail et al. | |

OTHER PUBLICATIONS

Non-final Office Action dated Sep. 3, 2015 for related U.S. Appl. No. 14/019,139.
Non-final Office Action dated Mar. 11, 2016 for related U.S. Appl. No. 14/019,139.
Non-final Office Action dated Jun. 30, 2016 for related U.S. Appl. No. 14/270,705.

(Continued)

*Primary Examiner* — Khanh B Pham
(74) *Attorney, Agent, or Firm* — Vista IP Law Group, LLP

(57) ABSTRACT

A method for dynamically adjusting between asynchronous and synchronous data replication policies in a networked virtualization environment, includes identifying a current data replication policy for a user virtual machine (VM) determining a load level by a source service VM associated with the user VM and calculating a desired data replication policy for the user VM based on at least the load level.

36 Claims, 16 Drawing Sheets

(56) References Cited

OTHER PUBLICATIONS

Final Office Action dated Sep. 26, 2016 for related U.S. Appl. No. 14/019,139.
Final Office Action dated Dec. 14, 2016 for related U.S. Appl. No. 14/270,705.
Advisory Action dated Dec. 29, 2016 for related U.S. Appl. No. 14/019,139.
Non-final Office Action dated Mar. 7, 2016 for related U.S. Appl. No. 14/019,139.
Non-Final Office Action dated Mar. 23, 2017 for related U.S. Appl. No. 14/270,705.
Notice of Allowance and Fee(s) Due dated Jul. 11, 2017 for related U.S. Appl. No. 14/270,705.
Final Office Action dated Jul. 12, 2017 for related U.S. Appl. No. 14/019,139.
Notice of Allowance and Fee(s) Due dated Dec. 6, 2017 for related U.S. Appl. No. 14/019,139.
"Good Migrations—Moving Data from SAN to SAN": by Gerorge Crump: pp. 1-7: StorageSwiss.com: Jul. 18, 2013.
"ESG Lab Review: Nutanix Complete Cluster": by Ginny Roth, Tony Palmer and Emil Flock: pp. 1-14: Enterprise Strategy Group: May 2012.

\* cited by examiner

SYSTEM AND METHODS FOR DYNAMICALLY ADJUSTING BETWEEN ASYNCHRONOUS AND SYNCHRONOUS DATA REPLICATION POLICIES IN A NETWORKED VIRTUALIZATION ENVIRONMENT

CROSS REFERENCE TO RELATED APPLICATIONS

The present application is related to application Ser. No. 13/207,345, filed on Aug. 10, 2011, entitled "ARCHITECTURE FOR MANAGING I/O AND STORAGE FOR A VIRTUALIZATION ENVIRONMENT", and application Ser. No. 14/019,139, filed on Sep. 5, 2013, entitled "SYSTEM AND METHODS FOR PERFORMING DISTRIBUTED DATA REPLICATION IN A NETWORKED VIRTUALIZATION ENVIRONMENT", which are all hereby incorporated by reference in their entirety.

FIELD

This disclosure concerns a mechanism for performing data replication in a networked virtualization environment, and in particular to a mechanism for dynamically adjusting between asynchronous and synchronous data replication policies in a networked virtualization environment.

BACKGROUND

Data replication involves replicating data located at a source (e.g., source virtualization environment) to a destination (e.g., destination virtualization environment). This may be performed for the purpose of disaster recovery, where data replicated from the source to the destination may be later recovered at the destination when the source undergoes failure.

Two modes of data replication currently exist: asynchronous data replication and synchronous data replication. Asynchronous data replication occurs where a write operation for a piece of data at a source is committed as soon as the source acknowledges the completion of the write operation. Replication of the data at the destination may occur at a later time after the write operation at the source has been committed. Synchronous data replication occurs where a write operation for a piece of data at a source is committed only after the destination has replicated the data and acknowledged completion of the write operation. Thus, in a synchronous data replication mode, a committed write operation for data at the source is guaranteed to have a copy at the destination.

Asynchronous data replication is advantageous in certain situations because it may be performed with more efficiency due to the fact that a write operation for data at the source can be committed without having to wait for the destination to replicate the data and acknowledge completion of the write operation. However, asynchronous data replication may result in potential data loss where the source fails prior to the replication of data at the destination.

Synchronous data replication guarantees that data loss will not occur when the source fails because the write operation for data is not committed until the destination has verified that it too has a copy of the data. However, having to wait for data to be written at both the source and the destination before committing a write operation may lead to latency as well as strain on system resources (e.g., CPU usage, memory usage, network traffic, etc.).

Conventionally, data replication involves setting a fixed data replication policy (either synchronous or asynchronous). By setting a fixed data replication policy, the manner in which data replication occurs remains static regardless of the changing nature of the system (e.g. source networked virtualization environment or destination networked virtualization environment). System parameters such as the amount of data being replicated or the amount of resources being consumed by the source or destination may vary over time. Thus, fixing the data replication policy for a system fails to account for the dynamic fluctuation in system parameters and may lead to inefficiencies where the system parameters change substantially or frequently over the course of system operation.

Setting a fixed data replication policy may be efficient where the source and destination operate at a steady resource consumption rate and the amount of data to be replicated remains steady. However, where the rate of resource consumption or amount of data to be replicated exhibits volatility, the fixed data replication policy may lead to the underutilization of resources when additional resources are available or where the amount of data to be replicated significantly decreases. Similarly, inefficiency may occur where the fixed data replication policy overutilizes resource availability when fewer resources are available or where the amount of data to be replicated significantly increases.

SUMMARY

Embodiments of the present invention provide a method for dynamically adjusting between asynchronous and synchronous data replication policies in a networked virtualization environment, includes identifying a current data replication policy for a user virtual machine (VM) determining a load level by a source service VM associated with the user VM and calculating a desired data replication policy for the user VM based on at least the load level.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments", in various places throughout this specification are not necessarily referring to the same embodiment or embodiments.

Figure 1:
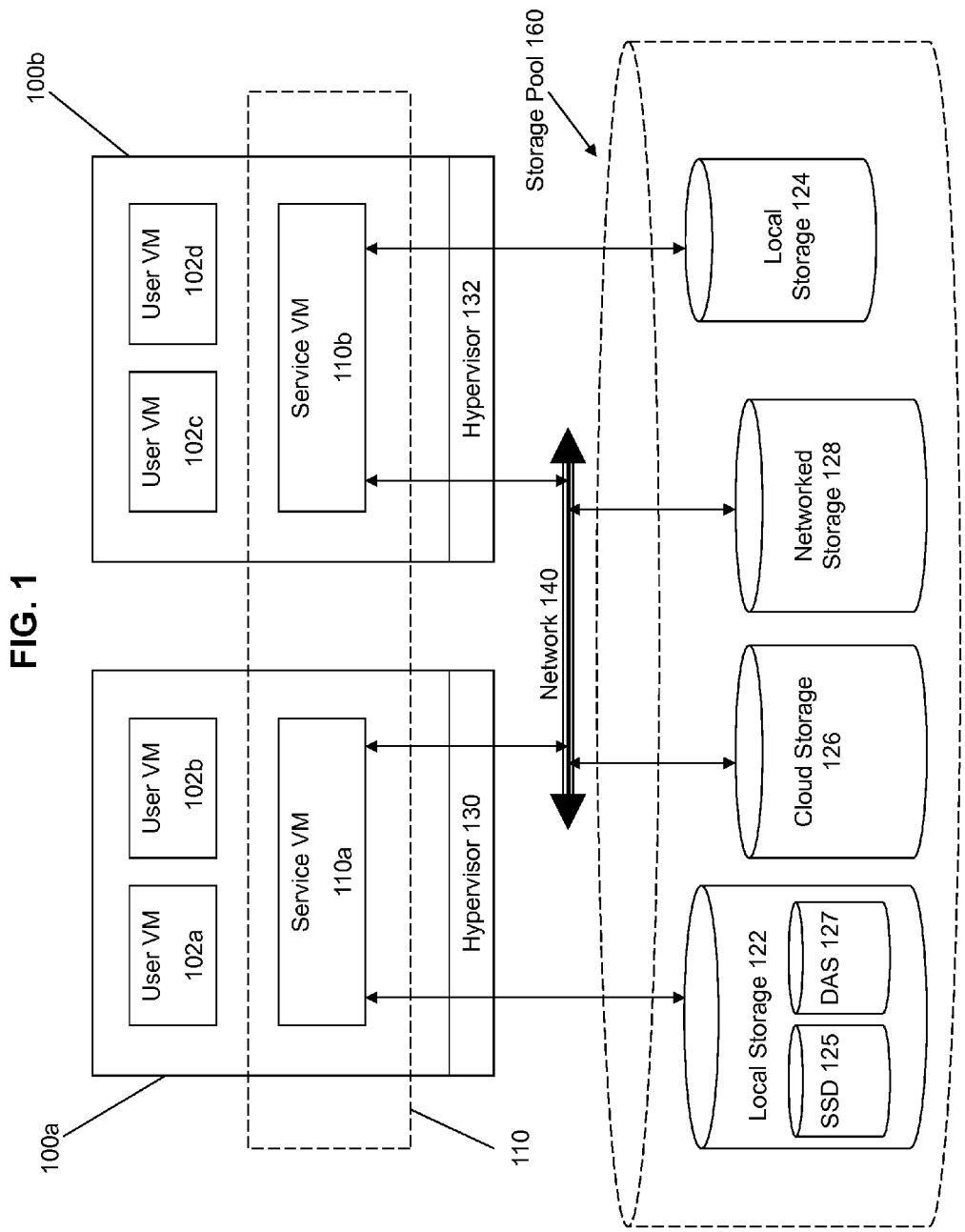
FIG. 1 illustrates a networked virtualization environment for storage management according to some embodiments of the invention.

FIG. 1 illustrates a networked virtualization environment for storage management according to some embodiments of the invention. The networked virtualization environment of FIG. 1 can be implemented for a distributed platform that contains multiple nodes (e.g., servers) 100a and 100b that manages multiple-tiers of storage. The multiple tiers of storage include storage that is accessible through a network 140, such as cloud storage 126 or networked storage 128 (e.g., a SAN or "storage area network"). Unlike the prior art, the present embodiment also permits local storage 122/124 that is within or directly attached to the node and/or appliance to be managed as part of the storage pool 160. Examples of such storage include Solid State Drives (henceforth "SSDs") 125 or Hard Disk Drives (henceforth "HDDs" or "spindle drives") 127. These collected storage devices, both local and networked, form a storage pool 160. Virtual disks (or "vDisks") can be structure from the storage devices in the storage pool 160. As used herein, the term vDisk refers to the storage abstraction that is exposed by a Service VM to be used by a user VM. In some embodiments, the vDisk is exposed via iSCSI ("internet small computer system interface") or NFS ("network file system") and is mounted as a virtual disk on the user VM.

Each node 100a or 100b runs virtualization software, such as VMWare ESX(i), Microsoft Hyper-V, or RedHat KVM. The virtualization software includes a hypervisor 130/132 to manage the interactions between the underlying hardware and the one or more user VMs 102a, 102b, 102c and 102d that run client software.

A special VM 110a/110b is used to manage storage and I/O activities according to some embodiments of the invention, which is referred to herein as a "Service VM". This is the "Storage Controller" in the currently described networked virtualization environment for storage management. Multiple such storage controllers coordinate within a cluster to form a single-system. The Service VMs 110a/110b are not formed as part of specific implementations of hypervisors 130/132. Instead, the Service VMs run as virtual machines above hypervisors 130/132 on the various servers 102a and 102b, and work together to form a distributed system 110 that manages all the storage resources, including the locally attached storage 122/124, the networked storage 128, and the cloud storage 126. Since the Service VMs run above the hypervisors 130/132, this means that the current approach can be used and implemented within any virtual machine architecture, since the Service VMs of embodiments of the invention can be used in conjunction with any hypervisor from any virtualization vendor.

Each Service VM 110a-b exports one or more block devices or NFS server targets that appear as disks to the client VMs 102a-d. These disks are virtual, since they are implemented by the software running inside the Service VMs 110a-b. Thus, to the user VMs 102a-d, the Service VMs 110a-b appear to be exporting a clustered storage appliance that contains some disks. All user data (including the operating system) in the client VMs 102a-d resides on these virtual disks.

Significant performance advantages can be gained by allowing the virtualization environment to access and utilize local (e.g., server-internal) storage 122. This is because I/O performance is typically much faster when performing access to local storage 122 as compared to performing access to networked storage 128 across a network 140. This faster performance for locally attached storage 122 can be increased even further by using certain types of optimized local storage devices, such as SSDs 125.

Once the virtualization environment is capable of managing and accessing locally attached storage, as is the case with the present embodiment, various optimizations can then be implemented to improve system performance even further. For example, the data to be stored in the various storage devices can be analyzed and categorized to determine which specific device should optimally be used to store the items of data. Data that needs to be accessed much faster or more frequently can be identified for storage in the locally attached storage 122. On the other hand, data that does not require fast access or which is accessed infrequently can be stored in the networked storage devices 128 or in cloud storage 126.

Another advantage provided by this approach is that administration activities can be handled on a much more efficient granular level. Recall that the prior art approaches of using a legacy storage appliance in conjunction with VMFS heavily relies on what the hypervisor can do at its own layer with individual "virtual hard disk" files, effectively making all storage array capabilities meaningless. This is because the storage array manages much coarser grained volumes while the hypervisor needs to manage finer-grained virtual disks. In contrast, the present embodiment can be used to implement administrative tasks at much smaller levels of granularity, one in which the smallest unit of administration at the hypervisor matches exactly with that of the storage tier itself.

Yet another advantage of the present embodiment of the invention is that storage-related optimizations for access and storage of data can be implemented directly within the primary storage path. For example, in some embodiments of the invention, the Service VM 110a can directly perform data deduplication tasks when storing data within the storage devices. This is far advantageous to prior art approaches that require add-on vendors/products outside of the primary storage path to provide deduplication functionality for a storage system. Other examples of optimizations that can be provided by the Service VMs include quality of service (QOS) functions, encryption and compression. The networked virtualization environment massively parallelizes storage, by placing a storage controller—in the form of a Service VM—at each hypervisor, and thus makes it possible to render enough CPU and memory resources to achieve the aforementioned optimizations.

Additional details regarding networked virtualization environments for storage management are described in co-pending application Ser. No. 13/207,345, entitled "Architecture for Managing I/O and Storage for a Virtualization Environment", which is hereby incorporated by reference in its entirety.

Data replication involves replicating data located at a source to a destination. This may be performed for the purpose of disaster recovery, where data replicated from the source to the destination may be later recovered at the destination when the source undergoes failure. The networked virtualization environment illustrated in FIG. 1 may be representative of the source networked virtualization environment or destination networked virtualization environment for purposes of data replication. A source service VM may be utilized to perform data replication for its corresponding user VM. The source service VM does so by identifying the file(s) to be replicated for a particular user VM and coordinating with one or more destination service VMs for performing replication of the file(s) at the destination. At the destination, one or more destination service VMs are assigned to the source service VM for receiving file(s) to be replicated and storing those files. Additional details for performing such distributed data replication may be found in co-pending application Ser. No. 14/019,139, entitled "System and Methods for Performing Distributed Data Replication in a Networked Virtualization Environment", which is incorporated by reference in its entirety.

Two modes of data replication exist: asynchronous data replication and synchronous data replication. Asynchronous data replication occurs where a write operation for a piece of data at a source is committed as soon as the source acknowledges the completion of the write operation. Replication of the data at the destination may occur at a later time after the write operation at the source has been committed. Synchronous data replication occurs where a write operation for a piece of data at a source is committed only after the destination has replicated the data and acknowledged completion of the write operation. Thus, in a synchronous data replication mode, a committed write operation for data at the source is guaranteed to have a copy at the destination.

Asynchronous data replication is advantageous in certain situations because it may be performed with more efficiency due to the fact that a write operation for data at the source can be committed without having to wait for the destination to replicate the data and acknowledge completion of the write operation. However, asynchronous data replication may result in potential data loss where the source fails prior to the replication of data at the destination.

Synchronous data replication guarantees that data loss will not occur when the source fails because the write operation for data is not committed until the destination has verified that it too has a copy of the data. However, having to wait for data to be written at both the source and the destination before committing a write operation may lead to latency as well as strain on system resources (e.g., CPU usage, memory usage, network traffic, etc.).

Conventionally, data replication involves setting a fixed data replication policy (either synchronous or asynchronous). A fixed synchronous data replication policy may be defined by various timing parameters such as the time taken for performing the data replication process or the wait time between successive data replication processes. In some situations, the fixed synchronous data replication policy may dictate the exact timing parameters for data replication such that performance of synchronous data replication under a particular policy must be made using the exact timing parameters of that particular policy. In other situations, the fixed synchronous data replication policy may provide a guideline for data replication such that performance of synchronous data replication under a particular policy attempts to meet the timing parameters of that particular policy without necessarily exactly meeting those timing parameters.

By setting a fixed data replication policy, the manner in which data replication occurs remains static regardless of the changing nature of the system (e.g., source networked virtualization environment or destination networked virtualization environment). System parameters such as the amount of data being replicated or the amount of resources being consumed by the source or destination may vary over time. Thus, fixing the data replication policy for a system fails to account for the dynamic nature of system parameters and may lead to inefficiencies where the system parameters change substantially or frequently over the course over system operation.

Setting a fixed data replication policy may be efficient where the source and destination operate at a steady resource consumption rate and the amount of data to be replicated remains steady. However, where the rate of resource consumption or amount of data to be replicated exhibits volatility, the fixed data replication policy may lead to the underutilization of resources when additional resources are available or where the amount of data to be replicated significantly decreases. Similarly, inefficiency may occur where the fixed data replication policy overutilizes resource availability when fewer resources are available or where the amount of data to be replicated significantly increases.

With the introduction of networked virtualization environments for storage management, such as the one described above in FIG. 1, various configurations between service VMs may exist for performing data replication. At any given time, any number of source service VMs may be servicing any number of user VMs. Each of the source service VMs may be assigned to any number of destination service VMs for performing data replication. Additionally, the destination service VM may assigned to numerous service VMs in addition to the source service VM for performing data replication.

Figure 2A:
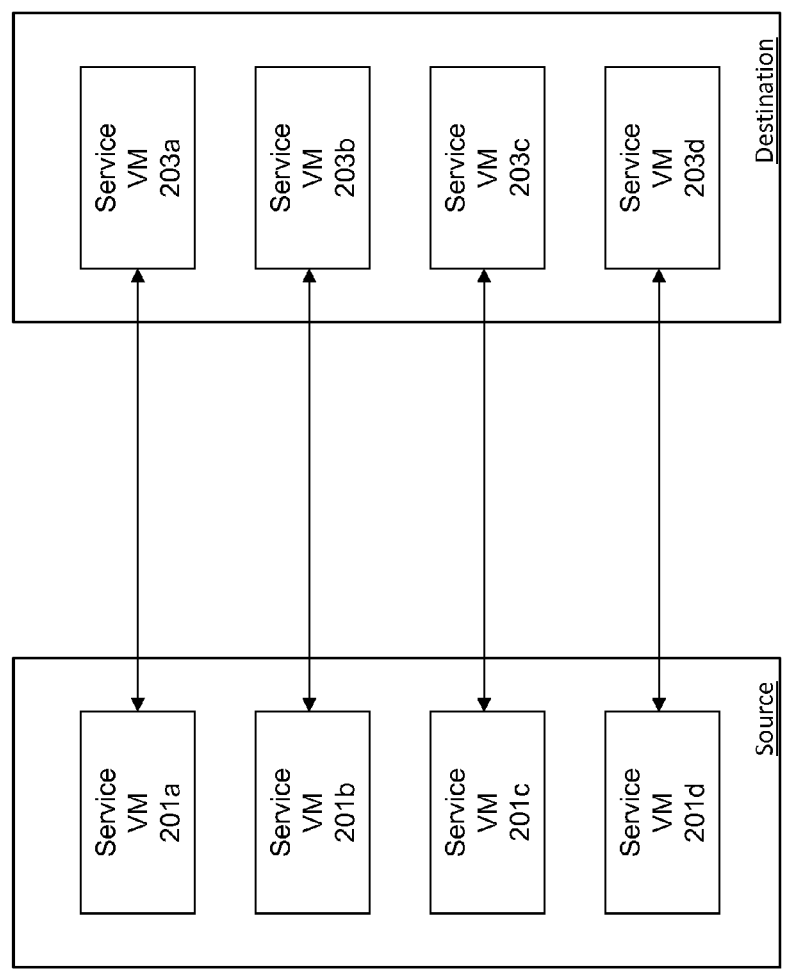
FIGS. 2A to 2C are schematic diagrams illustrating example source/destination configurations for data replication according to some embodiments of the invention.
Figure 2B:
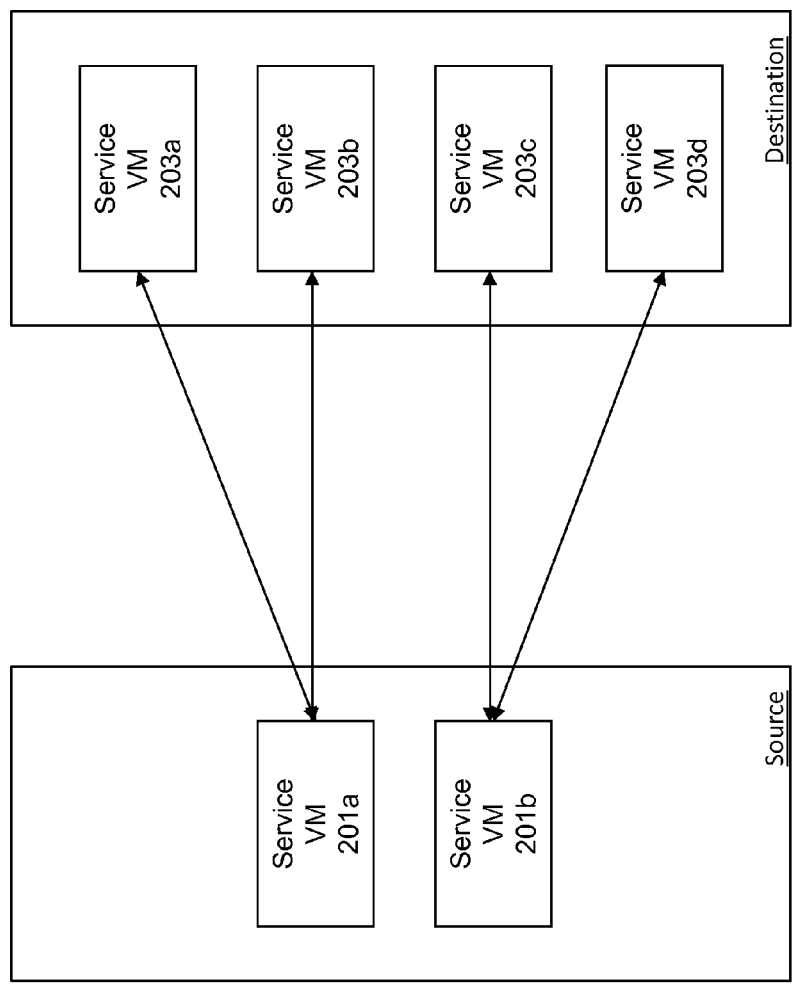
Figure 2C:
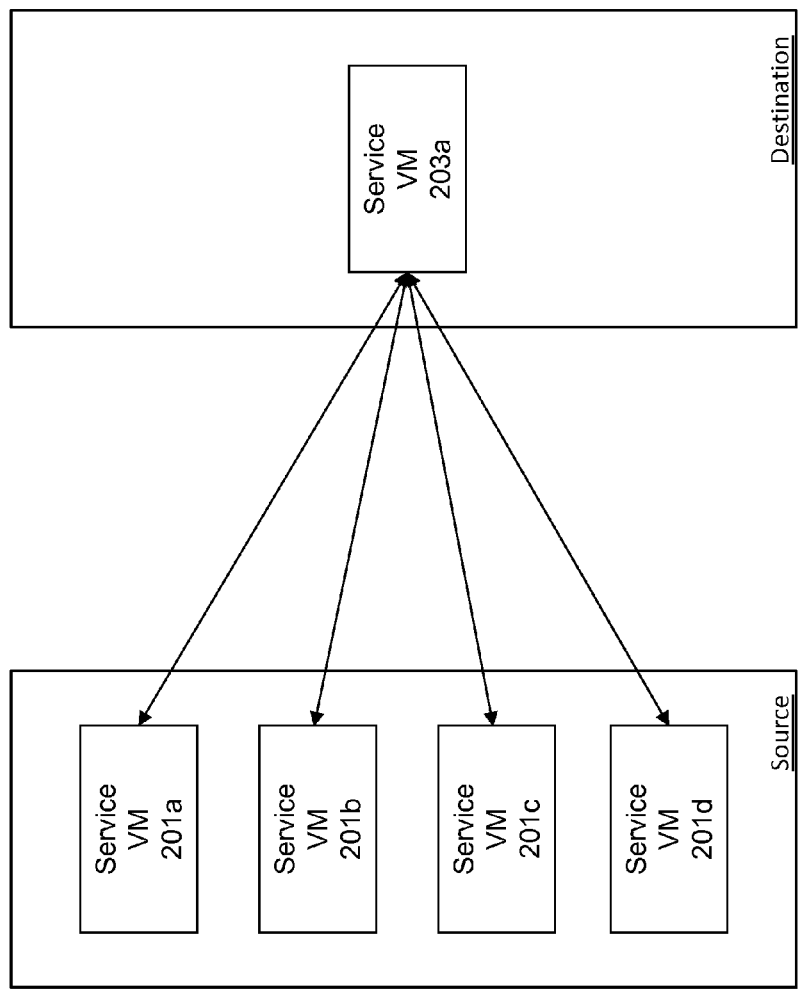

FIGS. 2A-C are schematic diagrams illustrating example source/destination configurations for data replication according to some embodiments of the invention. For purposes of illustration, the examples illustrated in FIGS. 2A-C will illustrate only the configurations of service VMs at the source and destination. However one ordinarily skilled in the art will recognize that any of the service VMs illustrated in FIGS. 2A-C may be servicing any number of user VMs and may have access to various physical resource configurations (e.g., CPU, memory, network bandwidth, etc.)

In FIG. 2A, a one-to-one configuration between source service VMs 201a-d and destination service VMs 203a-d is illustrated. A source service VM 201a-d servicing any number of user VMs (not shown) may be assigned to a corresponding destination service VM 203a-d for performing data replication. In the example illustrated in FIG. 2A, each destination service VM 203a-d is assigned to only a single service VM 201a-d at and provides data replication exclusively to that service VM at the source. It is important to note, however, that each destination service VM 203a-d may additionally be assigned to any number of other service VMs (not shown) in a networked virtualization environment other than the source for providing data replication to those other networked virtualization environments.

In this configuration, parameters associated with data replication may vary over time. For example, the number of user VMs serviced by a source service VM 201a-d may change over time. When the number of user VMs being serviced by a source service VM 201a-d increases, the amount of resources available to the source service VM 201a-d for performing data replication for a given user VM may be more limited, as the same amount of resources is distributed amongst a greater number of user VMs. In this situation, providing data replication to a given user VM using a fixed data replication policy, may increase strain on the resources or decrease the availability of those resources for servicing other user VMs associated with the source service VM 201 a-d. Similarly, when the number of user VMs being serviced by a source service VM 201a-d decreases, the amount of resources available to the source service VM 201a-d for performing data replication for a given user VM may be more abundant, as the same amount of resources is distributed amongst a lesser number of user VMs. In this situation, providing data replication to a given user VM using a fixed data replication policy, may result in underutilization of resources.

Likewise, when the number of user VMs serviced by the source service VM 201a-d increases, the amount of total data to be replicated for user VMs being serviced by a source service VM 201a-d may be increased. Because the total amount of data to be replicated may be increased, providing data replication to a given user VM using a fixed data replication policy may result in increased resource strain or decrease the availability of those resources available to the source service VM 201a-d for servicing other user VMs associated with the source service VM 201a-d.

Even when the number of user VMs and rate of data replication remains the same at the source, a corresponding destination service VM 203a-d may experience various parameter changes that decrease the efficiency of using a fixed data replication policy. For example, the destination service VM 203a-d assigned for performing data replication may itself be servicing an increase in user VMs. Replicating data using the same data replication policy would thereby create great strain on resources available to the destination service VM 203a-d. Similarly, the destination service VM 203a-d assigned for performing data replication may be servicing a decrease in user VMs. Replicating data using the same data replication policy would thereby underutilize resources available to the destination service VM 203a-d.

Likewise, the destination service VM 203a-d may additionally be assigned to any number of other service VMs (not shown) in a networked virtualization environment other than the source for providing data replication to user VMs in those other networked virtualization environments. The number of other service VMs assigned to the destination service VM 203a-d may also vary over time, and as such maintaining a fixed data replication policy may lead to the overutilization or underutilization of resources available to the destination service VM 203a-d.

In FIG. 2B, a one-to-many configuration between source service VMs 201a-b and destination service VMs 203a-d is illustrated. A source service VM 201a-b servicing any number of user VMs may be assigned to two or more corresponding destination service VMs 203a-d for performing data replication. In the example illustrated in FIG. 2B, each source service VM 201a-b is assigned to two destination service VMs 203a-d. The same issues that arise in the example illustrated in FIG. 2A are also present in FIG. 2B when a fixed data replication policy is used, and as such will not be described again.

In FIG. 2C, a many-to-one configuration between source service VMs 201a-d and a destination service VM 203a is illustrated. Two or more source service VMs 201a-d, each servicing any number of user VMs may be assigned to a single corresponding destination service VM 203a for performing data replication. In the example illustrated in FIG. 2C, a single destination service VM 203a is assigned to four different source service VMs 201a-d for performing data replication. The same issues that arise in the example illustrated in FIG. 2A are also present in FIG. 2B when a fixed data replication policy is used, and as such will not be described again.

As illustrated above, because of the various different configurations that may be used for performing data replication and the changing nature of parameters associated with the networked virtualization environments, various inefficiencies may arise when a fixed data replication policy is used. The dynamic nature of networked virtualization parameters such as the amount of data being replicated or the amount of resources available to and being consumed by the source service VM or destination service VM may vary over time regardless of whether an asynchronous data replication policy or synchronous data replication policy is used. As such, using a fixed data replication policy will necessarily lead to the inefficiencies described above.

What is needed, therefore, is a mechanism for dynamically adjusting between synchronous and asynchronous data replication policies. As used herein, the term dynamically adjusting between synchronous and asynchronous data replication policies may refer to the act of switching from an asynchronous data replication policy to a synchronous data replication policy or vice versa and may additionally refer to the act of transitioning between an asynchronous data replication policy with a first set of timing parameters to an asynchronous data replication policy with a different set of timing parameters.

By dynamically adjusting between different data replication policies, the fluctuations in system parameters during operation may be accounted for and the utilization of system resources may be made more optimal and efficient. For example, where the resources available to a service VM at the source or destination are heavily utilized (due to the number of user VMs being serviced or amount of data being replicated), the data replication policy may shift from a synchronous data replication policy to an asynchronous data replication policy. Alternatively, the data replication policy may shift from a synchronous data replication policy with a short replication time to a data replication policy with a longer replication time to account for the heavy resource utilization.

As another example, where the resources available to a service VM at the source or destination are underutilized (due to the number of user VMs being serviced or amount of data being replicated), the data replication policy may shift from an asynchronous data replication policy to a synchronous data replication policy. Alternatively, the data replication policy may shift from a synchronous data replication policy with a long replication time to a data replication policy with a shorter replication time to account for the low resource utilization.

Figure 3:
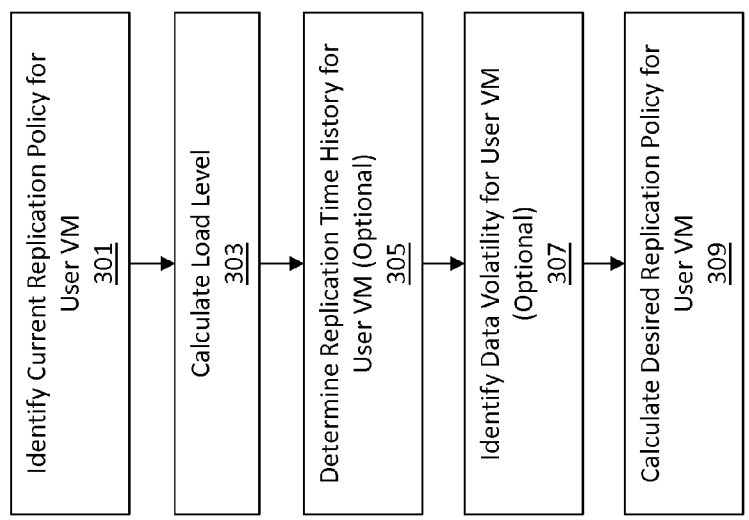
FIG. 3 is a flow diagram illustrating a method for dynamically adjusting between asynchronous and synchronous data replication policies according to some embodiments of the invention.

FIG. 3 is a flow diagram illustrating a method for dynamically adjusting between asynchronous and synchronous data replication policies according to some embodiments of the invention. The method will be described in the context of data replication for a single user VM. However, one ordinarily skilled in the art will recognize that the method may be extended to account for replication of any number of user VMs.

The process for dynamically adjusting between data replication policies may initiate under various different circumstances. In some circumstances, the process may begin at periodic intervals, such as every two hours. Alternatively, the process may begin when a resource utilization level at either the source or the destination rises above or falls below a particular threshold. As another example, the process for dynamically adjusting between data replication policies may initiate whenever a service VM loses or gains additional user VMs.

When the process for dynamically adjusting between data replication policies initiates, a current data replication policy for a user VM is first identified as shown at 301.

An administrator or user of the user VM may establish a preferred data replication policy. In some embodiments, the data replication policy may be a synchronous data replication policy, where every write operation of data for the user VM is not committed until the data is replicated and the write operation is acknowledged at the destination. In some other embodiments, the data replication policy may be an asynchronous data replication policy, where a write operation of data for the user VM is committed once the source has acknowledged the write operation. The asynchronous data replication policy may indicate a time period for performing data replication. For example, the asynchronous data replication policy may indicate that data replication is to be performed in five minutes. Alternatively, the asynchronous data replication policy may indicate a time period between successive data replications. For example, the synchronous data replication policy may indicate that a five minute period of time passes between successive replication steps. Additionally, the asynchronous data replication policy may indicate a total time period for data replication. For example, the asynchronous data replication policy may indicate that data replication is to be performed for five minutes with a five minute pause between successive replication steps.

A load level may then be determined by the source service VM as shown at 303. In some embodiments, the load level may indicate the current amount of resources being utilized by the source service VM. The load level being utilized by the source service VM may be important in determining how the data replication policy should be adjusted because it indicates the amount of additional load the source service VM can take on or the amount of load the source service VM needs to be reduced by in order to perform at an optimal level.

In other embodiments, the load level may indicate the current amount of resources being utilized by the source service VM as well as the amount of resources being utilized by the destination service VM. The load level being utilized by the destination service VM may be important in determining how the data replication policy should be adjusted because it indicates the amount of additional load the destination service VM can take on or the amount of load the destination service VM needs to be reduced by in order to perform at an optimal level.

In some embodiments, service VMs may monitor their own resources usage. In this situation, the source service VM may determine its load level by consulting its monitored resource usage and the source service VM may determine the load level at the destination service VM by communicating with the destination service VM to determine the amount of resource usage at the destination. In some other embodiments, a central controller may monitor the resource usage of both the source service VM and the destination service VM, and the source service VM may communicate with the central controller to determine the load level for both the source and the destination.

The load level at either the source service VM, destination service VM or their combination may include various resource usage parameters such as, for example, CPU usage, memory usage, and network bandwidth utilization.

The source service VM may then optionally determine the replication time history of the user VM undergoing dynamic data replication policy adjustment as shown at 305. The replication time history of the user VM illustrates the actual time needed (e.g., time for data replication or time between data replications) for previous data replications performed for the user VM. By determining the replication time history of the user VM, the source service VM may gain a better understanding of the efficiency/inefficiency of previous data replication policies. For example, where a previous data replication policy is set to 5 minutes for performing data replication and data replication actually occurs in 3 minutes, the source service VM may determine that a more aggressive asynchronous data replication policy should be used. As another example, where a previous data replication policy is set to 5 minutes for performing data replication and data replication actually occurs in 7 minutes, the source service VM may determine that a less aggressive asynchronous data replication should be used.

The source service VM may also optionally determine the data volatility for the user VM undergoing dynamic data replication policy adjustment as shown at 307. The data volatility for the user VM provides an indication of the change in data replication rate over time. When a user VM experiences high data volatility, the data replication rate may change frequently over a short period of time. This may indicate that a less aggressive data replication policy is to be used in order to account for the constant flux in data replication rate. Likewise, when the user VM experiences low data volatility, the data replication rate may remain steady over a long period of time. This may indicate that a more aggressive data replication policy is to be used in order to account for the steadiness in data replication rate.

The source service VM may then calculate a desired data replication policy for the user VM as shown at 309. The desired data replication policy may apply a mathematical algorithm or set of rules that factors the various system parameters (e.g., load level, replication time history, data volatility) to determine a desired data replication policy. The factors may be given different weights in accordance with their effect on the system's ability to perform data replication. In some embodiments, the new data replication policy may shift from an asynchronous data replication policy to a synchronous data replication policy or vice versa. In other embodiments, the new data replication policy may shift from a synchronous data replication policy with a short replication time to a data replication policy with a longer replication time or vice versa.

In some embodiments, the shift in replication time from the current data replication policy to the desired data replication policy may involve lengthening or shortening the time for performing data replication. In other embodiments, the shift in replication time from a current data replication policy to a desired data replication policy may involve lengthening or shortening the time between successive data replications.

The source service VM may maintain a learning process for updating the rules or algorithm applied to the various system parameters (e.g., load level, replication time history, data volatility) for determining the desired data replication policy. Each time the data replication policy changes, the source service VM may feedback the new data replication policy along with the parameters used to determine the new data replication policy. Information corresponding to data replication using the desired data replication policy may then be monitored to generate statistics associated with the new data replication policy for determining how effective the current rules or algorithm being used to generate desired data replication policies are. The rules or algorithm may then be updated based on these monitored statistics.

Figure 4:
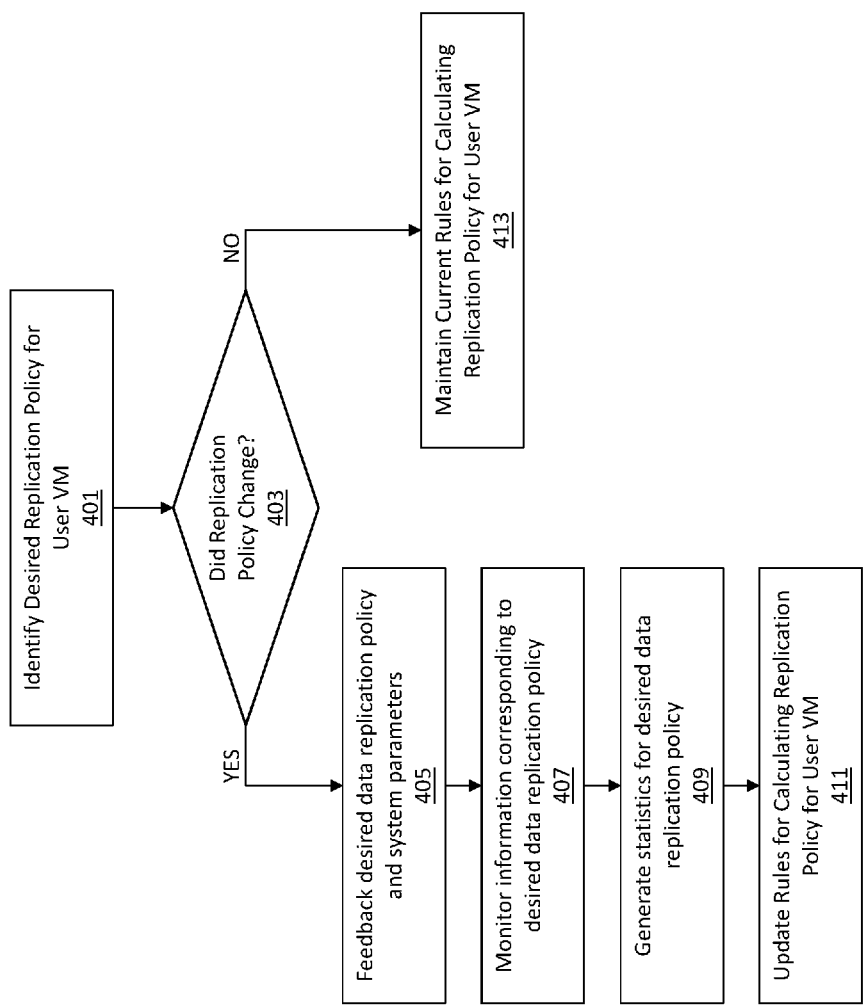
FIG. 4 is a flow diagram illustrating a method for employing a learning process for updating rules for dynamically adjusting between asynchronous and synchronous data replication policies according to some embodiments of the invention.

FIG. 4 is a flow diagram illustrating a method for employing a learning process for updating rules or a mathematical algorithm for dynamically adjusting between asynchronous and synchronous data replication policies according to some embodiments of the invention. Initially a desired data replication policy for a user VM is identified as shown at 401. The desired data replication policy may be identified, each time the source service VM goes through the process described above in FIG. 3. A determination is then made as to whether the desired data replication policy changed from a previous data replication policy as shown at 403. If the desired data replication policy did not change from the previous data replication policy, the current rules/algorithm for calculating data replication policies is maintained for the user VM as shown at 413.

If the desired data replication policy did change from the previous data replication policy, the desired data replication policy along with its associated system parameters are fed back to the source service VM as shown at 405. Information corresponding to data replication using the desired data replication policy may then be monitored as shown at 407 and the information may be used to generate statistics associated with the desired replication policy as shown at 409. Such statistics may include such items as time taken to perform data replication using the identified data replication policy, CPU usage for data replication under the identified data replication policy, memory usage for data replication under the identified data replication policy, network traffic associated with data replication under the identified data replication policy, etc. These statistics may then be used to update the rules or algorithm to be used for performing a subsequent change in data replication policy as shown at 411.

Figure 5:
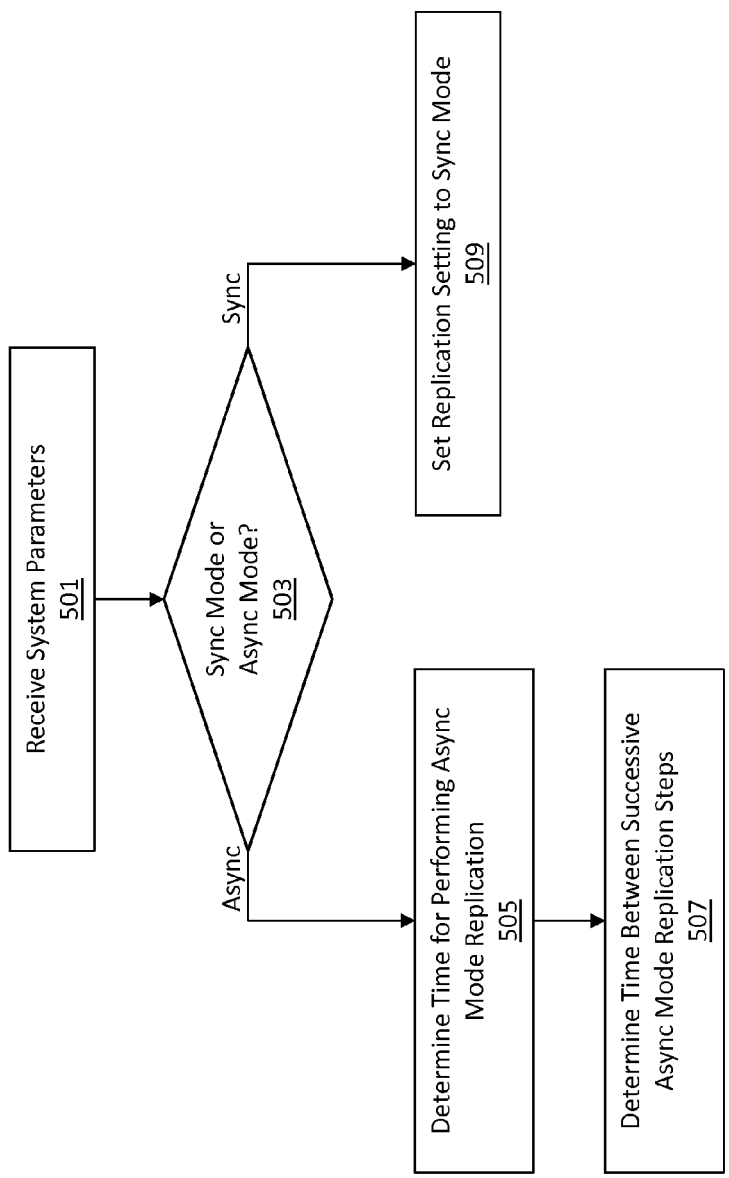
FIG. 5 is a flow diagram illustrating a method for adjusting data replication policies between asynchronous and synchronous data replication according to some embodiments of the invention.

FIG. 5 is a flow diagram illustrating a method for dynamically adjusting between asynchronous and synchronous data replication policies for a user VM according to some embodiments of the invention. Initially, a set of system parameters are received by the source service VM as shown at 501. The set of system parameters may identify certain information about the user VM undergoing data replication, as well as information about its corresponding source service VM and corresponding destination service VM, which are utilized for determining a desired data replication policy for the user VM.

As discussed above, the system parameters may include such information as a calculated load level for the source service VM or the destination service VM, a replication time history for the user VM and the data volatility associated with the user VM.

An algorithm or set of rules may be applied to the replication policy parameters to determine a new data replication policy for the user VM. In determining the new data replication policy for the user VM, the source service VM may first apply an algorithm or set of rules to the set of system parameters to determine whether the desired data replication policy should be a synchronous policy or an asynchronous policy as shown at 503.

For example, where the load level is low at both the source and the destination, the replication time history for the user VM indicates that data replication typically completes in a much shorter time period than the prescribed data replication policy, and the data volatility remains steady, a determination may be made to transition the data replication policy to a synchronous policy. Alternatively, where the load level is high at both the source and the destination, the replication time history for the user VM indicates that data replication typically completes in a longer period of time than the prescribed data replication policy, and the data is highly volatile, a determination may be made to transition the data replication policy to a synchronous data policy.

When a determination is made to transition the data replication policy to a synchronous policy, the data replication policy is set to a synchronous mode as shown at 509. The synchronous policy does not require any adjustment to replication timing parameters such as the time for performing data replication and the time between successive data replications. This is because the synchronous policy operates under a static set of timing parameters where each write operation for data at the source is not committed until the write operation is replicated and acknowledged at the destination.

When a determination is made to transition the data replication policy to an asynchronous data replication policy, timing parameters for the new asynchronous data replication policy must first be determined. Such timing parameters may be determined by applying an algorithm or set of rules to the system parameters. In determining timing parameters for the new asynchronous data replication policy, a time for performing an asynchronous mode data replication operation may first be determined as shown at 505. The time for performing the asynchronous mode data replication operation indicates how long it should take to perform data replication for the user VM. A time between successive asynchronous data replication steps may also be determined as shown at 507. The time between successive asynchronous data replication steps indicates the length of a wait time between successive asynchronous data replication steps.

Figure 6A:
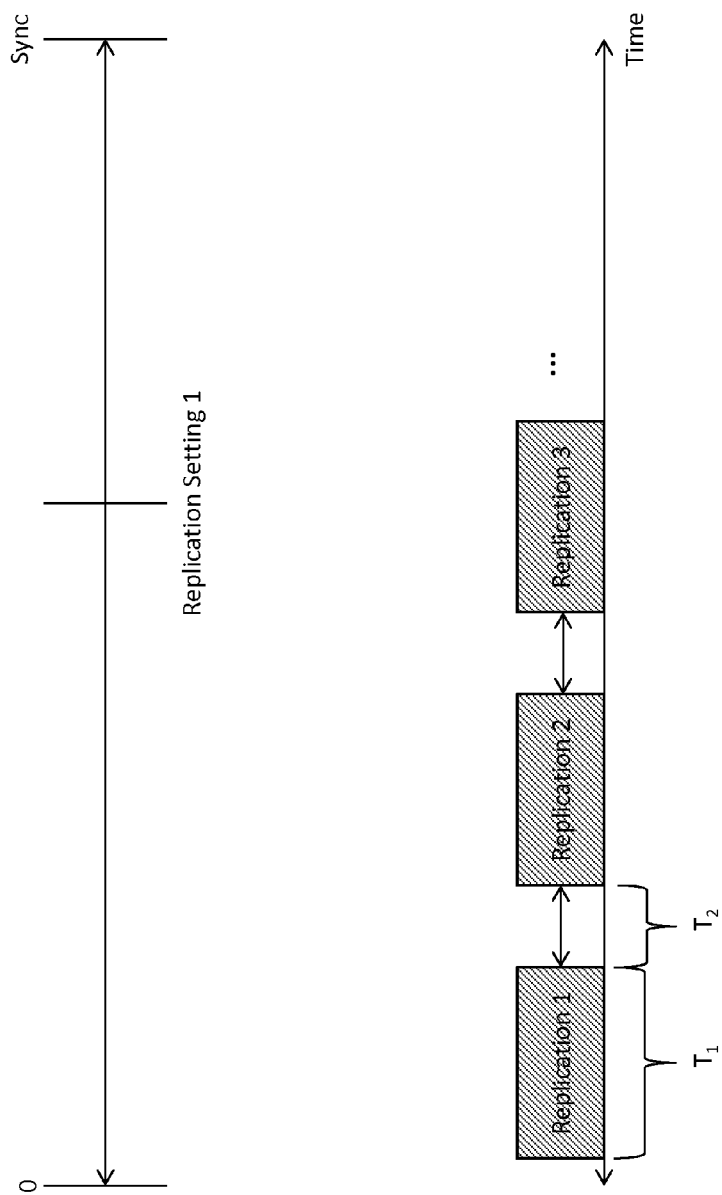
FIGS. 6A to 6H illustrate examples of dynamically adjusting between asynchronous and synchronous data replication policies according to some embodiments of the invention.

FIGS. 6A to 6E illustrate an example of dynamically adjusting between asynchronous and synchronous data replication policies according to some embodiments of the invention. FIG. 6A illustrates a current data replication policy for a user VM. The illustration in the upper half of FIG. 6A provides a representation of where the current data replication policy lies between a purely synchronous data replication policy and a non-existent data replication policy where data is never replicated. The purely synchronous data replication policy is indicated by the label "Sync" and the non-existent data replication policy is indicated by the label "0".

The current data replication policy illustrated in FIG. 6A is an asynchronous data replication policy. The timing parameters of the current asynchronous data replication policy is illustrated in the bottom half of FIG. 6A. The time for performing data replication is indicated by $T_1$ and the time between successive asynchronous data replication steps is indicated by $T_2$. Although a particular set of timing parameters in the bottom portion of FIG. 6A is shown to correspond to the current asynchronous data replication policy in the top portion of FIG. 6A illustrated, one ordinarily skilled in the art will recognize that other timing parameter configurations may also correspond to the current asynchronous data replication policy in the top portion of FIG. 6A.

Figure 6B:
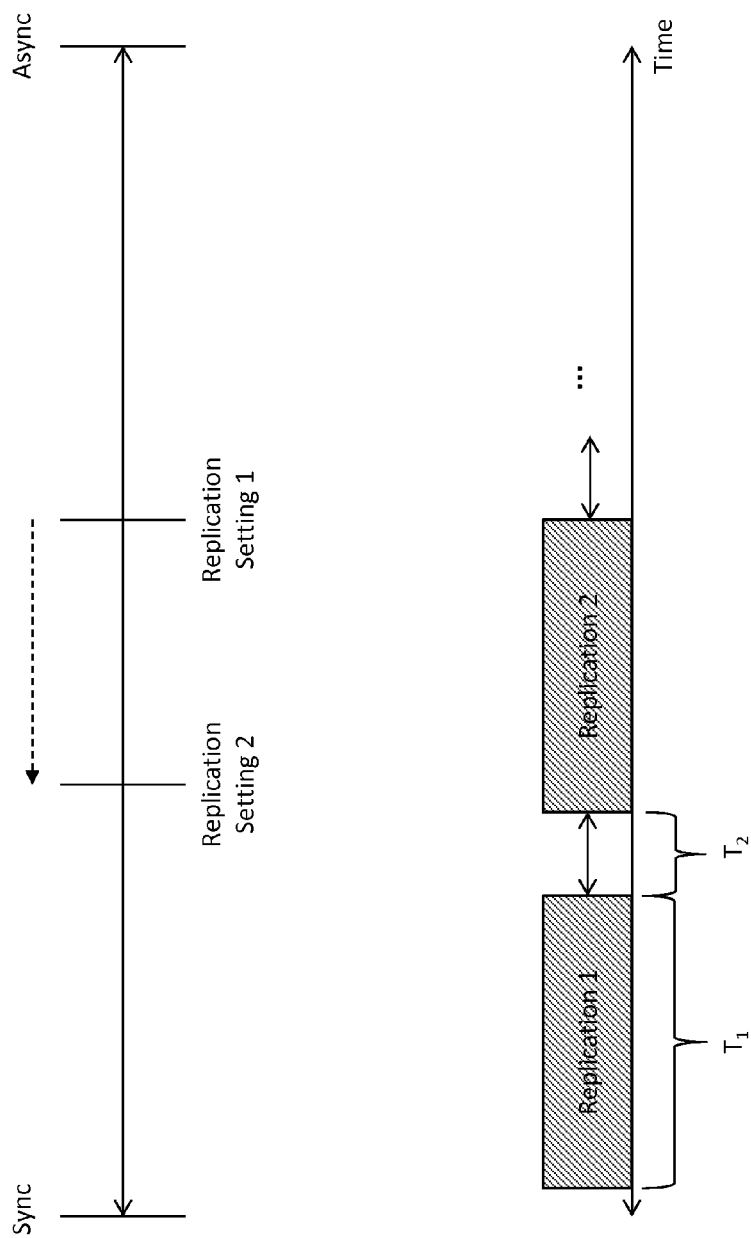
Figure 6C:
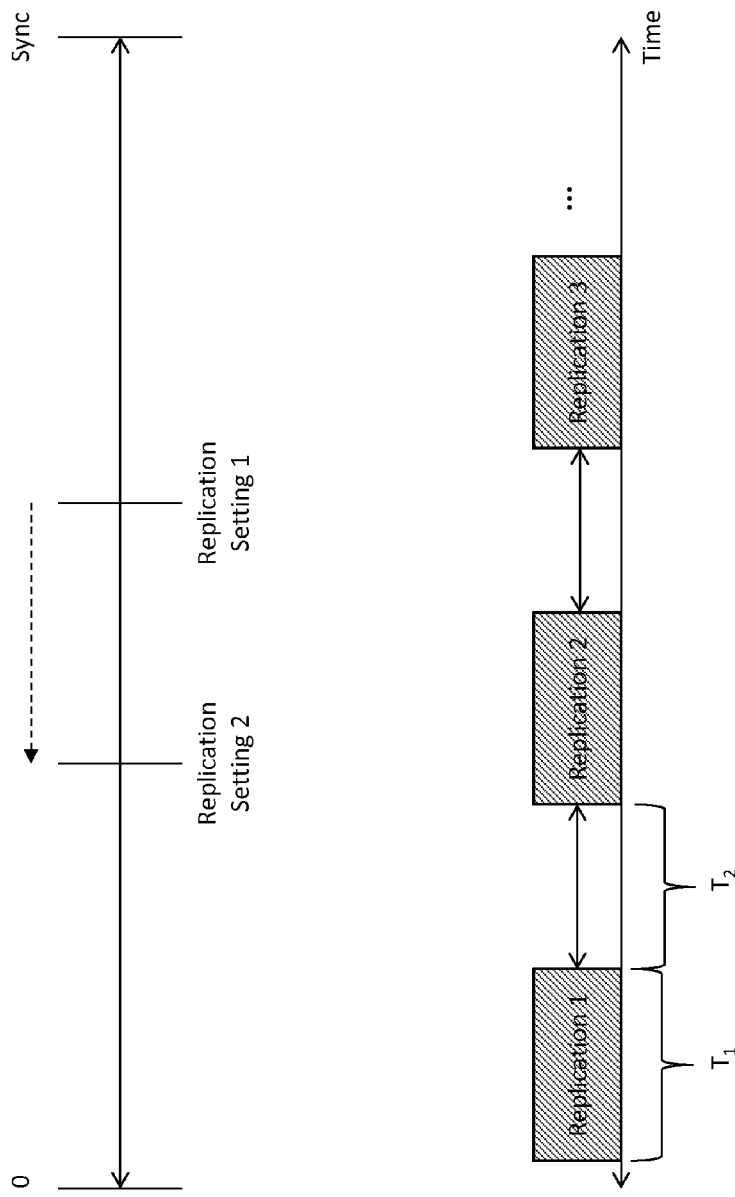
Figure 6D:
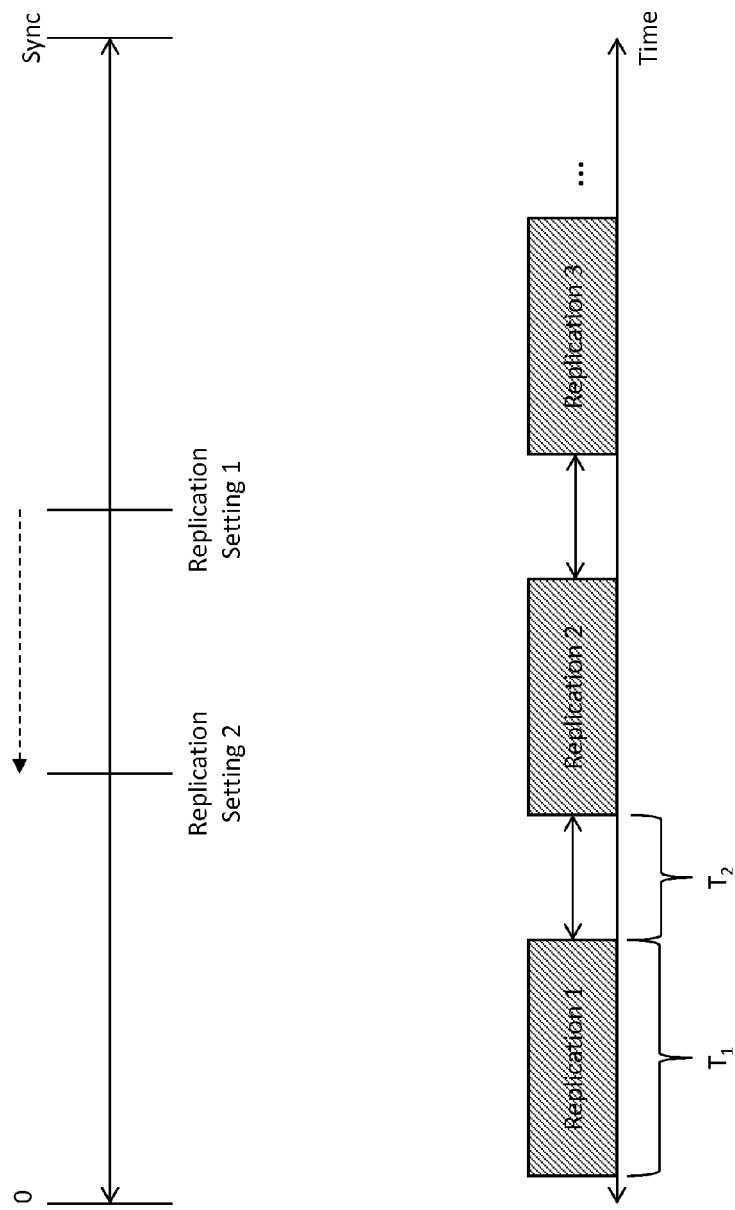

FIGS. 6B-D illustrate a desired data replication policy for the user VM after the user VM undergoes a method for dynamically adjusting between asynchronous and synchronous data replication policies, such as the one described above in FIG. 3. In FIGS. 6B-D, the desired data replication policy is determined to be an asynchronous data replication policy that lies closer to the non-existent data replication policy as illustrated in the top portion of FIGS. 6B-D. In other words, the desired data replication policy is slowed down in comparison to the current data replication policy. This may be due to various factors, such as an increase in load levels of the source or destination service VMs, a replication timing history that indicates a pattern of the actual time needed for previous data replications performed for the user VM being greater than the prescribed replication time, or an increase in data volatility for the user VM.

The timing parameters for the current data replication policy are adjusted to generate the desired data replication policy. The timing parameters may be adjusted by lengthening the time for data replication $T_1$ and maintaining the time between successive data replication steps $T_2$ as illustrated in FIG. 6B. The timing parameters may alternatively be adjusted by lengthening the time between successive data replication steps $T_2$ while maintaining the time for data replication $T_1$ as shown in FIG. 6C. The timing parameters may also be alternatively adjusted by lengthening the time for data replication $T_1$ and lengthening the time between successive data replication steps $T_2$ as illustrated in FIG. 6D.

Figure 6E:
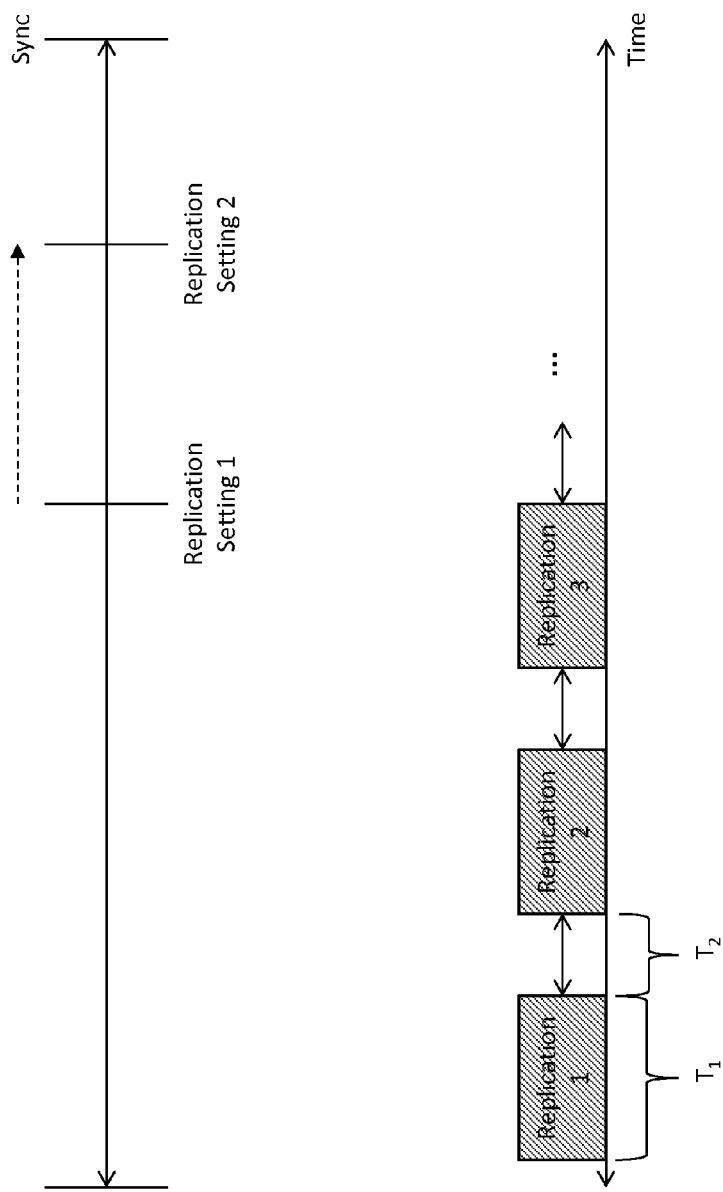
Figure 6F:
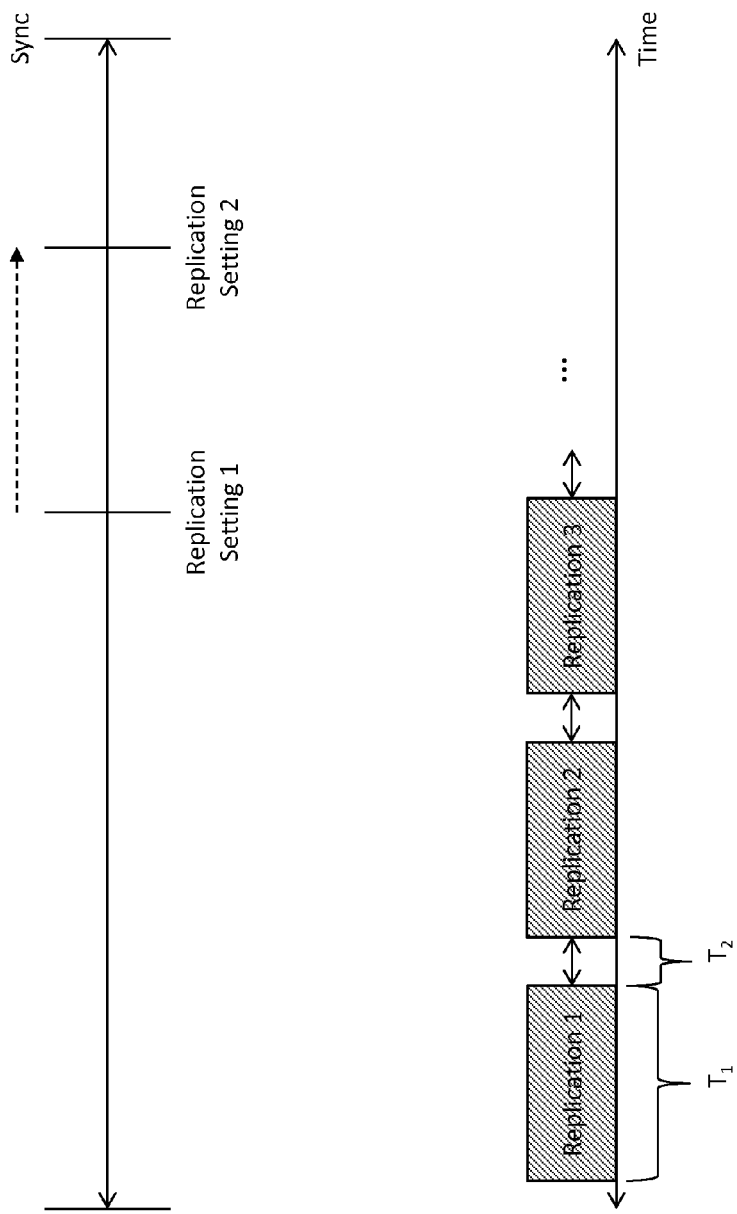
Figure 6G:
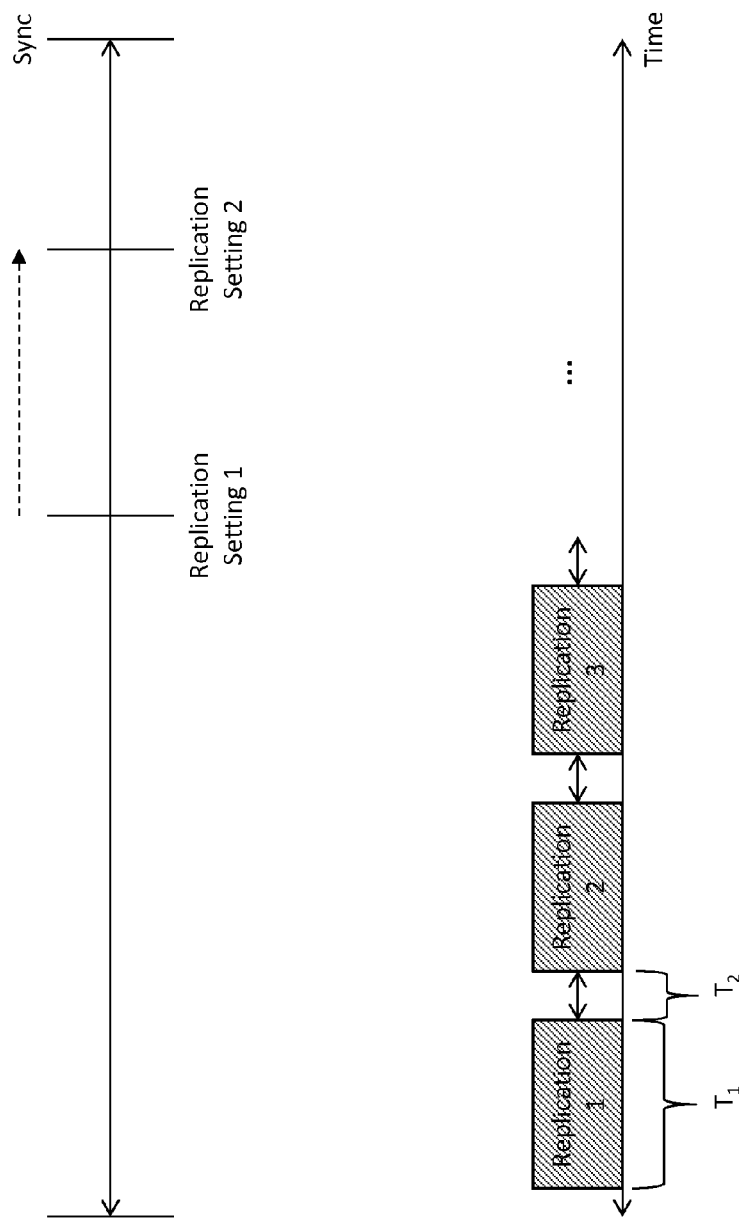

FIGS. 6E-G illustrate another example of a desired data replication policy for the user VM after the user VM undergoes a method for dynamically adjusting between asynchronous and synchronous data replication policies, such as the one described above in FIG. 3. In FIGS. 6E-G, the desired data replication policy is determined to be an asynchronous data replication policy that lies closer to the asynchronous data replication policy as illustrated in the top portion of FIGS. 6E-G. In other words, the desired data replication policy is sped up in comparison to the current data replication policy. This may be due to various factors, such as a decrease in load levels of the source or destination service VMs, a replication timing history that indicates a pattern of the actual time needed for previous data replications performed for the user VM being less than the prescribed replication time, or a decrease in data volatility for the user VM.

The timing parameters for the current data replication policy are adjusted to generate the desired data replication policy. The timing parameters may be adjusted by shortening the time for data replication $T_1$ and maintaining the time between successive data replication steps $T_2$ as illustrated in FIG. 6E. The timing parameters may alternatively be adjusted by shortening the time between successive data replication steps $T_2$ while maintaining the time for data replication $T_1$ as shown in FIG. 6F. The timing parameters may also be alternatively adjusted by shortening the time for data replication $T_1$ and shortening the time between successive data replication steps $T_2$ as illustrated in FIG. 6G.

Figure 6H:
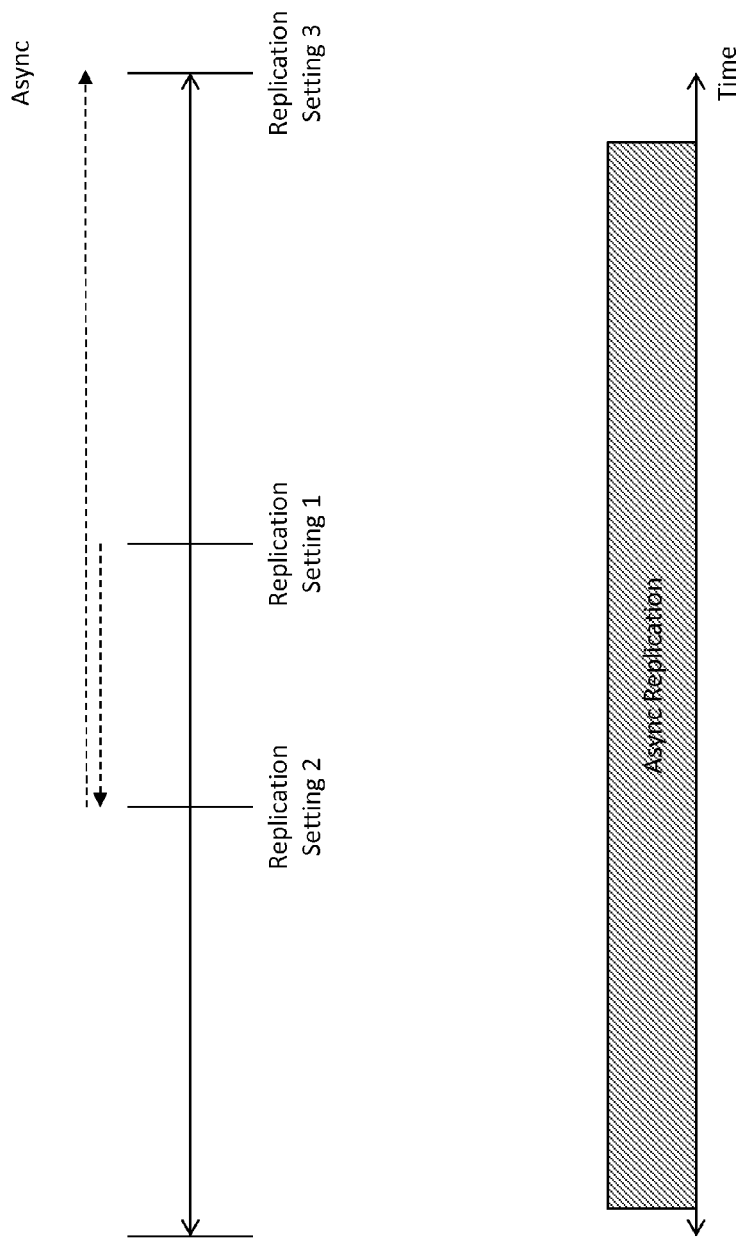

FIG. 6H illustrates another example of a desired data replication policy for the user VM after the user VM undergoes a method for dynamically adjusting between asynchronous and synchronous data replication policies, such as the one described above in FIG. 3. In FIG. 6H, the desired data replication policy is determined to be a synchronous data replication policy as illustrated in the top portion of FIG. 6H. The synchronous replication policy continuously commits write operations for data at the source only after replication of the data and acknowledgement of the write operation at the destination, which is illustrated in the bottom portion of FIG. 6H. The transition from an asynchronous data replication policy to a synchronous data replication policy may be due to various factors, such as a significant decrease in load levels of the source or destination service VMs, a replication timing history that indicates a pattern of the actual time needed for previous data replications performed for the user VM being less than the prescribed replication time, or a significant decrease in data volatility for the user VM.

System Architecture

Figure 7:
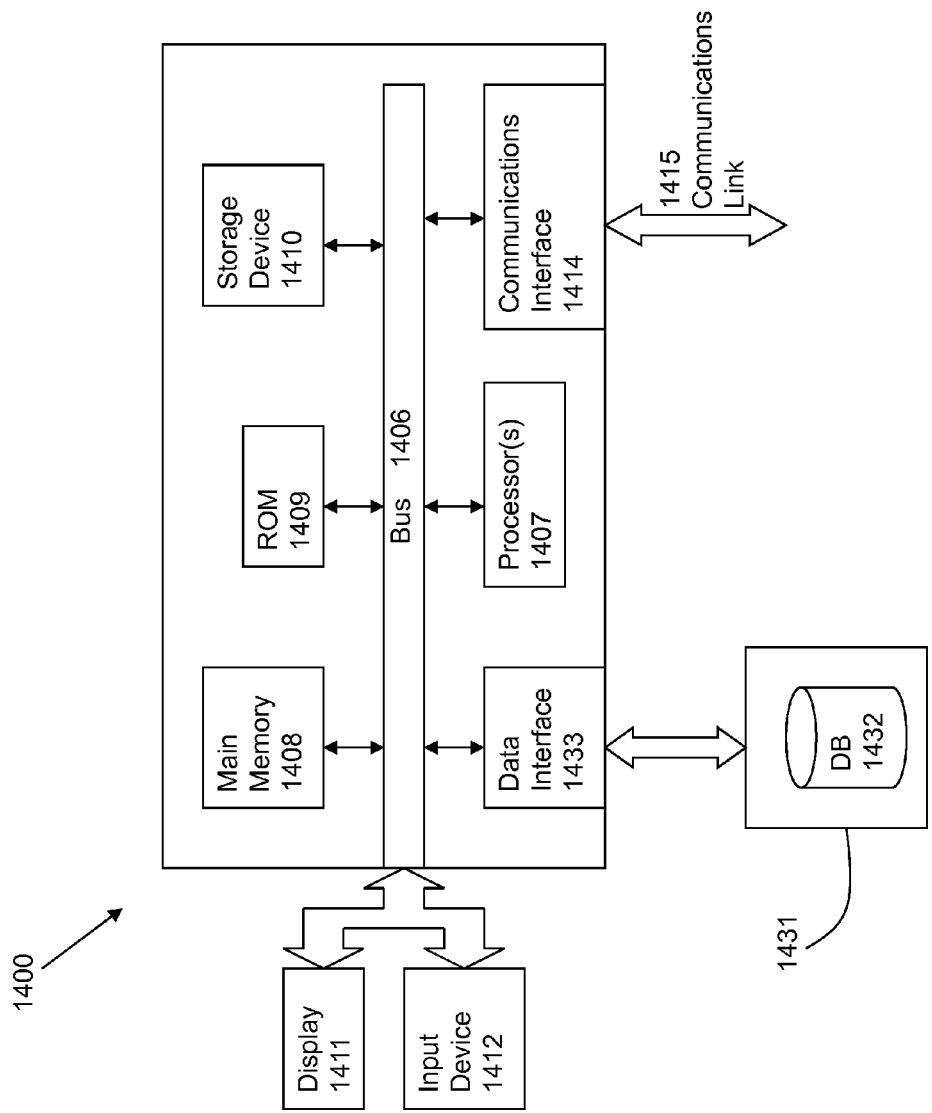
FIG. 7 is a block diagram of an illustrative computing system suitable for implementing an embodiment of the present invention.

FIG. 7 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for dynamically adjusting between asynchronous and synchronous data replication policies in a networked virtualization environment, comprising:
   identifying a plurality of nodes in the networked virtualization environment,
      wherein at least some of the plurality of nodes comprise a plurality of user virtual machines, a hypervisor, and a service virtual machine (VM),
      wherein the service VM is a storage controller for the plurality of user virtual machines, and
      wherein the service VM working with other service VMs manages a storage pool comprising a plurality of storage resources spread across the at least some of the plurality of nodes;
   identifying a current data replication policy for the plurality of user virtual machines that are managed by a source service virtual machine (VM);
   determining a load level for the source service VM and a destination service virtual machine (VM) associated with the source service VM, the load level indicating a current amount of resources being utilized by both the source service VM and the destination service VM, wherein the source service VM and the destination service VM are virtual machines running above respective hypervisors;
   calculating a desired data replication policy for the plurality of user virtual machines based on at least the load level that indicates the current amount of resources being utilized by both the source service VM and the destination service VM, wherein when the desired data replication policy is an asynchronous data replication policy, indicating an amount of time for performing an asynchronous data replication operation, the amount of time determined from a replication time history of previous data replications performed for the user VM;
   dynamically adjusting from the current replication policy, by the source service virtual machine, to the desired data replication policy of the asynchronous data replication policy;
   replicating data from the source service virtual machine to the destination service virtual machine based at least in part on the desired data replication policy; and
   monitoring information corresponding to the desired data replication policy dynamically adjusted for performing a subsequent change in data replication policy.

2. The method of claim 1, wherein the source service VM and the destination service VM monitor their own respective resource usage.

3. The method of claim 1, wherein a central controller monitors resource usage for the source service VM and the destination service VM.

4. The method of claim 1, wherein the load level includes CPU usage, memory usage, or network bandwidth utilization.

5. The method of claim 1, wherein the source service virtual machine is assigned to two or more corresponding destination service virtual machines for performing data replication.

6. The method of claim 1, wherein a plurality of source service virtual machines is assigned to a single corresponding destination service virtual machines for performing data replication.

7. The method of claim 1, further comprising determining a measure of data volatility for a user VM from the plurality of user virtual machines.

8. The method of claim 7, wherein calculating the desired data replication policy for the user VM is based on at least the measure of data volatility for the user VM.

9. The method of claim 1, wherein the desired data replication policy is calculated using a mathematical algorithm.

10. The method of claim 9, wherein the source service VM employs a learning process for updating the mathematical algorithm for calculating the desired data replication policy.

11. The method of claim 1, wherein the desired data replication policy is calculated using a set of rules.

12. The method of claim 11, wherein the source service VM employs a learning process for updating the set of rules for calculating the desired data replication policy.

13. The method of claim 1, wherein the desired data replication policy is a synchronous data replication policy.

14. The method of claim 1, wherein the subsequent change in data replication policy comprises shortening or lengthening the amount of time for performing an asynchronous data replication operation based at least in part on the information monitored.

15. The method of claim 1, wherein the subsequent change in data replication policy comprises adjusting a time between successive asynchronous data replication operations based at least in part on the information monitored.

16. The method of claim 1, wherein the asynchronous data replication policy further indicates a time between successive asynchronous data replication steps.

17. The method of claim 1, wherein the method for dynamically adjusting between asynchronous and synchronous data replication policies initiates at periodic intervals.

18. The method of claim 1, wherein the method for dynamically adjusting between asynchronous and synchronous data replication policies initiates when a resource utilization level rises above or falls below a threshold.

19. A computer program product embodied on a non-transitory computer readable medium, the non-transitory computer readable medium having stored thereon a sequence of instructions which, when executed by a processor causes the processor to execute a method for dynamically adjusting between asynchronous and synchronous data replication policies in a networked virtualization environment, comprising:

identifying a plurality of nodes in the networked virtualization environment,
  wherein at least some of the plurality of nodes comprise a plurality of user virtual machines, a hypervisor, and a service virtual machine (VM),
  wherein the service VM is a storage controller for the plurality of user virtual machines, and
  wherein the service VM working with other service VMs manages a storage pool comprising a plurality of storage resources spread across the at least some of the plurality of nodes;
identifying a current data replication policy for the plurality of user virtual machines that are managed by a source service virtual machine (VM);
determining a load level for the source service VM and a destination service virtual machine (VM) associated with the source service VM, the load level indicating a current amount of resources being utilized by both the source service VM and the destination service VM, wherein the source service VM and the destination service VM are virtual machines running above respective hypervisors;
calculating a desired data replication policy for the plurality of user virtual machines based on at least the load level that indicates the current amount of resources being utilized by both the source service VM and the destination service VM, wherein when the desired data replication policy is an asynchronous data replication policy, indicating an amount of time for performing an asynchronous data replication operation, the amount of time determined from a replication time history of previous data replications performed for the user VM;
dynamically adjusting from the current replication policy, by the source service virtual machine, to the desired data replication policy of the asynchronous data replication policy;
replicating data from the source service virtual machine to the destination service virtual machine based at least in part on the desired data replication policy; and
monitoring information corresponding to the desired data replication policy dynamically adjusted for performing a subsequent change in data replication policy.

20. The computer program product of claim 19, wherein the source service VM and the destination service VM monitor their own respective resource usage.

21. The computer program product of claim 19, wherein a central controller monitors resource usage for the source service VM and the destination service VM.

22. The computer program product of claim 19, wherein the load level includes CPU usage, memory usage, or network bandwidth utilization.

23. The computer program product of claim 19, wherein the source service virtual machine is assigned to two or more corresponding destination service virtual machines for performing data replication.

24. The computer program product of claim 19, wherein a plurality of source service virtual machines is assigned to a single corresponding destination service virtual machines for performing data replication.

25. The computer program product of claim 19, further comprising determining a measure of data volatility for a user VM from the plurality of user virtual machines.

26. The computer program product of claim 25, wherein calculating the desired data replication policy for the user VM is based on at least the measure of data volatility for the user VM.

27. The computer program product of claim 19, wherein the desired data replication policy is calculated using a mathematical algorithm.

28. The computer program product of claim 27, wherein the source service VM employs a learning process for updating the mathematical algorithm for calculating the desired data replication policy.

29. The computer program product of claim 19, wherein the desired data replication policy is calculated using a set of rules.

30. The computer program product of claim 29, wherein the source service VM employs a learning process for updating the set of rules for calculating the desired data replication policy.

31. The computer program product of claim 19, wherein the desired data replication policy is a synchronous data replication policy.

32. The computer program product of claim 19, wherein the subsequent change in data replication policy comprises shortening or lengthening the amount of time for performing an asynchronous data replication operation based at least in part on the information monitored.

33. The computer program product of claim 19, wherein the subsequent change in data replication policy comprises adjusting a time between successive asynchronous data replication operations based at least in part on the information monitored.

34. The computer program product of claim 19, wherein the asynchronous data replication policy further indicates a time between successive asynchronous data replication steps.

35. The computer program product of claim 19, wherein the method for dynamically adjusting between asynchronous and synchronous data replication policies initiates at periodic intervals.

36. The computer program product of claim 19, wherein the method for dynamically adjusting between asynchronous and synchronous data replication policies initiates when a resource utilization level rises above or falls below a threshold.

* * * * *